United States Patent [19]
Monge et al.

[11] Patent Number: 6,105,035
[45] Date of Patent: Aug. 15, 2000

[54] METHOD BY WHICH NOTIONS AND CONSTRUCTS OF AN OBJECT ORIENTED PROGRAMMING LANGUAGE CAN BE IMPLEMENTED USING A STRUCTURED QUERY LANGUAGE (SQL)

[75] Inventors: Daryl Lee Monge; Thomas Alan Schultz, both of Naperville, Ill.

[73] Assignee: Lucent Technologies, Inc., Murray Hill, N.J.

[21] Appl. No.: 09/024,913

[22] Filed: Feb. 17, 1998

[51] Int. Cl.[7] ................................. G06F 17/30
[52] U.S. Cl. ................. 707/103; 707/1; 707/3; 707/4; 707/102; 707/200
[58] Field of Search .................. 707/103, 102, 707/1, 200, 3, 2

[56] References Cited

U.S. PATENT DOCUMENTS

| | | | |
|---|---|---|---|
| 5,202,981 | 4/1993 | Shackelford | 707/1 |
| 5,297,279 | 3/1994 | Bannon et al. | 707/103 |
| 5,437,027 | 7/1995 | Bannon et al. | 707/103 |
| 5,446,883 | 8/1995 | Kirkbride et al. | 707/103 |
| 5,617,514 | 4/1997 | Dolby et al. | 706/45 |
| 5,659,723 | 8/1997 | Dimitrios et al. | 707/103 |
| 5,659,725 | 8/1997 | Levy et al. | 707/5 |
| 5,659,727 | 8/1997 | Velissaropoulos et al. | 707/2 |
| 5,664,181 | 9/1997 | Velissaropoulos et al. | 707/102 |
| 5,699,310 | 12/1997 | Garloff et al. | 395/701 |
| 5,761,493 | 6/1998 | Blakeley et al. | 707/4 |
| 5,774,692 | 6/1998 | Boyer et al. | 709/300 |
| 5,778,223 | 7/1998 | Velissaropoulos et al. | 707/100 |
| 5,787,425 | 7/1998 | Bigus | 707/6 |
| 5,794,041 | 8/1998 | Law et al. | 395/701 |
| 5,794,231 | 8/1998 | Li et al. | 707/2 |
| 5,819,257 | 10/1998 | Monge et al. | 707/2 |
| 5,826,259 | 10/1998 | Doktor | 707/4 |
| 5,842,204 | 11/1998 | Andrews et al. | 707/31 |
| 5,873,075 | 2/1999 | Cochrane et al. | 707/2 |
| 5,893,108 | 4/1999 | Srinivasan et al. | 707/103 |
| 5,907,847 | 5/1999 | Goldberg | 707/103 |

OTHER PUBLICATIONS

McCornick, John, "10 Hot Spreadsheets," Government computer News, V15, n8A pp. 1–6, Apr. 1996.
Leroy Jean Louis, "Multiple inheritance for MFC 4.0," Dr. Dobb's journal, V21, N1, pp. 1–4, Jan 1996.
Celko Joe, "A look at SQL trees," DBMS, V9, N3, pp. 1–9, Mar. 1996.

*Primary Examiner*—Hosain T. Alam
*Assistant Examiner*—Jean M. Corrielus

[57] ABSTRACT

Certain types of modeling problems solvable using object oriented computer programming languages can be solved using standard structure query programming languages (SQL). By appropriately tabulating relationships of these problems, the tables can be operated on using predetermined SQL procedures that can use well-known object oriented computer programming language concepts.

12 Claims, 12 Drawing Sheets tracking entity class graph tracking entity class attributes

| project | software | hardware |
|---|---|---|
| application | est_ncsl | boards |
| release | | chips |
| customer | | |

| feature | large_feature | small_feature |
|---|---|---|
| status | load | deploy |
| cost | | |

| code | xlarge_feature | xsmall_feature |
|---|---|---|
| ncsl | duration | target |
| faults | | |

FIG. 3 tracking entity class methods

<u>project</u>
authorize: project_authorize

<u>feature</u>
authorize: feature_authorize

<u>software</u>
authorize: software_authorize

<u>hardware</u>
authorize: hardware_authorize

<u>code</u>
authorize: code_authorize

<u>small_feature</u>
authorize: small_feature_authorize

<u>xsmall_feature</u>

<u>large_feature</u>

<u>xlarge_feature</u>

FIG. 4 tracking entity object instance graph

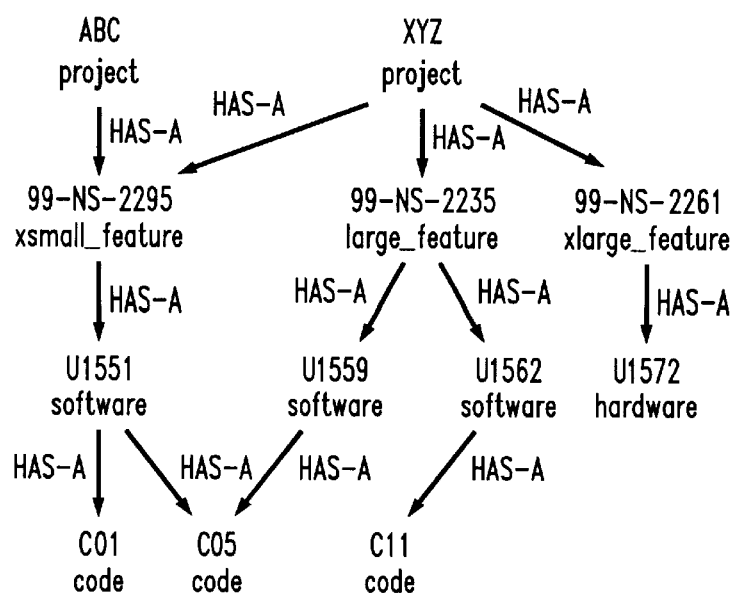

FIG. 5 tracking_entity_class

| tracking_entity_class | description |
|---|---|
| project | The root in a tracking entity instance graph |
| feature | A collection of software and hardware units |
| large_feature | A feature that also tracks load information |
| small_feature | A feature that also tracks deploy information |
| xlarge_feature | A large_feature that also tracks duration information |
| xsmall_feature | A small_feature that also tracks target information |
| software | A collection of code units |
| hardware | Hardware tracking information |
| code | A collection of ncsl and fault metrics |

FIG. 6 tracking_entity_class_edge

| parent_tracking_entity_class | child_tracking_entity_class | edge |
|---|---|---|
| project | feature | HAS-A |
| feature | software | HAS-A |
| feature | hardware | HAS-A |
| software | code | HAS-A |
| feature | large_feature | IS-A |
| feature | small_feature | IS-A |
| large_feature | xlarge_feature | IS-A |
| small_feature | xsmall_feature | IS-A |

FIG. 7 tracking_entity_class_attribute

| tracking_entity_class | attribute | datatype |
|---|---|---|
| project | application | char |
| project | release | char |
| project | customer | char |
| software | est_ncsl | int |
| hardware | boards | int |
| hardware | chips | int |
| feature | status | char |
| feature | cost | float |
| large_feature | load | char |
| small_feature | deploy | char |
| code | ncsl | int |
| code | faults | int |
| xlarge_feature | duration | float |
| xsmall_feature | target | int |

FIG. 8 tracking_entity_class_method

| tracking_entity_class | message | method |
|---|---|---|
| project | authorize | project_authorize |
| feature | authorize | feature_authorize |
| software | authorize | software_authorize |
| hardware | authorize | hardware_authorize |
| code | authorize | code_authorize |
| tracking_entity_class | message | method |
| small_feature | authorize | small_feature_authorize |

FIG. 9 tracking_entity

| tracking_entity | tracking_entity_class | organization |
|---|---|---|
| ABC | project | JC210 |
| XYZ | project | JC212 |
| 99-NS-2295 | xsmall_feature | JC212 |
| 99-NS-2235 | large_feature | JC231 |
| 99-NS-2261 | xlarge_feature | JC237 |
| U1551 | software | JC248 |
| U1559 | software | JC211 |
| U1562 | software | JC231 |
| U1572 | hardware | JC258 |
| C01 | code | JC237 |
| C05 | code | JC583 |
| C11 | code | JC754 |

FIG. 10 tracking_entity_edge

| parent_tracking_entity | child_tracking_entity | edge |
|---|---|---|
| ABC | 99-NS-2295 | HAS-A |
| XYZ | 99-NS-2295 | HAS-A |
| XYZ | 99-NS-2235 | HAS-A |
| XYZ | 99-NS-2261 | HAS-A |
| 99-NS-2295 | U1551 | HAS-A |
| 99-NS-2235 | U1559 | HAS-A |
| 99-NS-2235 | U1562 | HAS-A |
| 99-NS-2261 | U1572 | HAS-A |
| U1551 | C01 | HAS-A |
| U1551 | C05 | HAS-A |
| U1559 | C05 | HAS-A |
| U1562 | C11 | HAS-A |

FIG. 11 tracking_entity_attribute

| tracking entity | attribute | charvalue | intvalue | floatvalue |
|---|---|---|---|---|
| 99-NS-2295 | status | GREEN | | |
| 99-NS-2295 | cost | | | 123,000 |
| 99-NS-2295 | deploy | 03/14/1998 | | |
| 99-NS-2295 | target | | 47,000 | |
| 99-NS-2235 | status | YELLOW | | |
| 99-NS-2235 | cost | | | 87,000 |
| 99-NS-2235 | load | X1254 | | |
| 99-NS-2261 | status | YELLOW | | |
| 99-NS-2261 | cost | | | 65,000 |
| 99-NS-2261 | load | X187 | | |
| 99-NS-2261 | duration | | | 236.85 |
| U1551 | est_ncsl | | 5,000 | |
| U1559 | est_ncsl | | 2,000 | |
| U1562 | est_ncsl | | 17,000 | |
| U1572 | boards | | 3 | |
| U1572 | chips | IC787 | 156 | |
| C01 | ncsl | | 2,311 | |
| C01 | faults | | 53 | |
| C05 | ncsl | | 3,237 | |
| C05 | faults | | 13 | |
| C11 | ncsl | | 15,428 | |
| C11 | faults | | 87 | |

FIG. 11A tracking_entity_attribute

| tracking entity | attribute | charvalue | intvalue | floatvalue |
|---|---|---|---|---|
| ABC | application | Xwire | | |
| ABC | release | P4.0 | | |
| ABC | customer | Spain | | |
| XYZ | application | EXMR | | |
| XYZ | release | P4.1 | | |
| XYZ | customer | US | | |

FIG. 12 tracking_entity_class_path

| parent tracking entity class | child tracking entity class | edge | path_length | path_count |
|---|---|---|---|---|
| project | project | REFLEXIVE | 0 | 1 |
| feature | feature | REFLEXIVE | 0 | 1 |
| software | software | REFLEXIVE | 0 | 1 |
| hardware | hardware | REFLEXIVE | 0 | 1 |
| code | code | REFLEXIVE | 0 | 1 |
| large_feature | large_feature | REFLEXIVE | 0 | 1 |
| small_feature | small_feature | REFLEXIVE | 0 | 1 |
| xlarge_feature | xlarge_feature | REFLEXIVE | 0 | 1 |
| xsmall_feature | xsmall_feature | REFLEXIVE | 0 | 1 |
| project | feature | HAS-A | 1 | 1 |
| feature | software | HAS-A | 1 | 1 |
| feature | hardware | HAS-A | 1 | 1 |
| software | code | HAS-A | 1 | 1 |
| feature | large_feature | IS-A | 1 | 1 |
| feature | small_feature | IS-A | 1 | 1 |
| large_feature | xlarge_feature | IS-A | 1 | 1 |
| small_feature | xsmall_feature | IS-A | 1 | 1 |
| feature | code | IS-A | 2 | 1 |
| feature | xlarge_feature | IS-A | 2 | 1 |
| feature | xsmall_feature | IS-A | 2 | 1 |

FIG. 13 tracking_entity_path

| parent tracking entity | child tracking entity | edge | path_count |
|---|---|---|---|
| ABC | ABC | REFLEXIVE | 1 |
| XYZ | XYZ | REFLEXIVE | 1 |
| 99-NS-2295 | 99-NS-2295 | REFLEXIVE | 1 |
| 99-NS-2235 | 99-NS-2235 | REFLEXIVE | 1 |
| 99-NS-2261 | 99-NS-2261 | REFLEXIVE | 1 |
| U1551 | U1551 | REFLEXIVE | 1 |
| U1559 | U1559 | REFLEXIVE | 1 |
| U1562 | U1562 | REFLEXIVE | 1 |
| U1572 | U1572 | REFLEXIVE | 1 |
| C01 | C01 | REFLEXIVE | 1 |
| C05 | C05 | REFLEXIVE | 1 |
| C11 | C11 | REFLEXIVE | 1 |
| ABC | 99-NS-2295 | HAS-A | 1 |
| XYZ | 99-NS-2295 | HAS-A | 1 |
| XYZ | 99-NS-2235 | HAS-A | 1 |
| XYZ | 99-NS-2261 | HAS-A | 1 |
| 99-NS-2295 | U1551 | HAS-A | 1 |
| 99-NS-2235 | U1559 | HAS-A | 1 |
| 99-NS-2235 | U1562 | HAS-A | 1 |
| 99-NS-2261 | U1572 | HAS-A | 1 |
| U1551 | C01 | HAS-A | 1 |
| U1551 | C05 | HAS-A | 1 |
| U1559 | C05 | HAS-A | 1 |
| U1562 | C11 | HAS-A | 1 |
| ABC | U1551 | HAS-A | 1 |

FIG. 13A tracking_entity_path

| parent tracking entity | child tracking entity | edge | path_count |
|---|---|---|---|
| ABC | C01 | HAS-A | 1 |
| ABC | C05 | HAS-A | 1 |
| 99-NS-2295 | C05 | HAS-A | 1 |
| 99-NS-2295 | C01 | HAS-A | 1 |
| XYZ | U1551 | HAS-A | 1 |
| XYZ | C05 | HAS-A | 2 |
| XYZ | U1559 | HAS-A | 1 |
| XYZ | U1562 | HAS-A | 1 |
| XYZ | U1572 | HAS-A | 1 |
| 99-NS-2235 | C05 | HAS-A | 1 |
| 99-NS-2235 | C11 | HAS-A | 1 | inheritance hierarchy inheritance hierarchy

METHOD BY WHICH NOTIONS AND CONSTRUCTS OF AN OBJECT ORIENTED PROGRAMMING LANGUAGE CAN BE IMPLEMENTED USING A STRUCTURED QUERY LANGUAGE (SQL)

TECHNICAL FIELD

The invention generally relates to computer relational database programming languages, systems, and more particularly to methods and system for implementing the notions of object oriented programming using a structured query language.

RELATED APPLICATION

The Detailed Description of the U.S. patent application Ser. No. 08/790,302 filed Jan. 31, 1997 now U.S. Pat. No. 5,819,257 for "Process for Providing Transitive Closure Using Fourth Generation Structured Query Language (SQL)" and which is assigned to Lucent Technologies, Inc., is incorporated herein by reference.

DESCRIPTION OF THE PRIOR ART

Object oriented computer programming and design methodology has become popular as a way of modeling and solving many programming problems. Traditionally, the implementation of such systems has been performed using an object oriented programming language such as C++.

Those skilled in the art know that object oriented programming languages share at least five unique and defining concepts or notions. These concepts, which are discussed fully in the relevant literature pertaining to object oriented programming, are known as: CLASSES, OBJECTS; INHERITANCE; POLYMORPHISM, and ENCAPSULATION.

The literature on object-oriented programming contains a more complete discussion of the notions of object-oriented programming.

Briefly, a CLASS can be considered to be a template or collection of attributes and methods (i.e. procedures). An OBJECT is an instance of a class that has specific attributes and corresponding values. INHERITANCE provides the ability for one class to share attribute and method specifications with other classes.

Objects communicate with one another via "message passing." A "message" is a text string such as "redraw__ourself". When an object receives a message, a corresponding class method is executed.

It is well-known that in object-oriented programming, different OBJECTS of an object-oriented programming language will respond to messages differently.

POLYMORPHISM is the ability for all objects to respond appropriately to messages received. For example, a "check box" graphical user interface object and a "list box" graphical user interface object both know how to respond to a "redraw yourself" message, but respond differently in performing a redraw of themselves. Of course, each OBJECT must be written to respond to the particular message, but the response after a message is recognized and accepted is unique to the class specification.

ENCAPSULATION is the ability to hide data and processing in an OBJECT when an OBJECT is passed a message.

The notions of object-oriented programming are believed to make programming easier for many problem domains.

Once the code for a CLASS definition is written, tested, and found to work, the OBJECT instances can be created. By using class definitions in different object instance contexts, programming time is reduced.

In writing a computer program, only the OBJECTS need to be known and the messages recognized by them, not necessarily how they were written or how they work. The software design process time period can be considerably shortened for programs written using an object-oriented language.

The inventor has demonstrated that it is possible to determine the transitive closure of a directed acyclical graph using SQL which includes the steps of. 1) determining a table of vertices of the directed acyclical graph, 2) determining an edge table from all of the vertices; 3) deriving a path table from the vertex table and the edge table, and from the path table determining the existence of a path between any two nodes in the graph. This methodology is disclosed in U.S. patent application Ser. No. 08/790,302 filed on Jan. 31, 1997 now U.S. Pat. No. 5,819,257 for "Process for Providing Transitive Closure Using Fourth Generation Structured Query Language (SQL)".

A structured query language offers three advantages over object oriented programming languages. First, SQL is declarative: a request need only be specified, not the steps of a method to achieve the result. Second, SQL can be modeled using relational algebra or relational calculus meaning that it has a strong mathematical foundation by which program correctness can be assured. Finally, SQL is interpreted, not compiled meaning that CLASS and INSTANCE information can be changed at run time.

A method and system by which an interpretive, structured query language might be used to implement the constructs of an object oriented programming language would reduce software development time and simplify program maintenance while insuring program correctness.

Accordingly, an object of the present invention is to provide a method and system by which the notions and constructs of an object oriented programming language can be implemented using a structured query language.

SUMMARY OF THE INVENTION

The characteristics and operation of an object oriented programming language can be implemented using a structured query language. The notions of CLASSES and OBJECTS can be modeled as directed acyclic graphs. Since directed acyclical graphs can be represented using several tables, and since these tables can be analyzed and operated on using a structured query language, SQL can provide functionality that duplicates the object oriented programming language concepts of CLASSES, OBJECTS, INHERITANCE, POLYMORPHISM and ENCAPSULATION.

BRIEF DESCRIPTION OF THE DRAWINGS

FIG. 3 shows a table of methods used by the nodes of the directed acyclic graph of FIG. 1.

FIG. 4 shows another directed acyclic graph but of instances of the directed acyclic graph of FIG. 1.

FIG. 5 is a table of classes of tracking entities and a description of each.

FIG. 6 is a table listing parent and child nodes of the directed acyclic graph of FIG. 1 and the classification of edges linking them as either "IS-A" or "HAS-A" edges.

FIG. 7 is a tabulation of types of data of the attributes of each class shown in FIG. 1.

FIG. 8 is a tabulation of methods associated with messages exchanged between the classes shown in FIG. 1.

FIG. 9 is a tabulation of tracking entities organization and classes.

FIG. 10 is a tabulation of edges in the directed acyclic graph of FIG. 1 and the characterization of each as "HAS-A" or "IS-A".

FIG. 11 lists attributes of the tracking entities.

FIG. 11-A is a continuation of FIG. 11.

FIG. 12 lists paths, lengths, and a count of edges of the directed acyclic graph shown in FIG. 1

FIG. 13 is a transitive closure table for the directed acyclic graph shown in FIG. 1.

FIG. 13-A is a continuation of FIG. 13.

DETAILED DESCRIPTION OF THE PREFERRED EMBODIMENT

The implementation of object oriented programming concepts using SQL can be illustrated by way of an example of a planning problem modeled using directed acyclic graphs and tables that can be used to model directed acyclic graphs. In the examples that follow, the directed acyclic graphs are merely abstract, graphical representations of tabular data stored within and retrieved from the random access memory, or other storage media including a disk or tape for example, of any suitably programmable digital computer. Such tables can be created in the memory of a computer using SQL, as is well known to those skilled in the art.

Figures 1, 2:
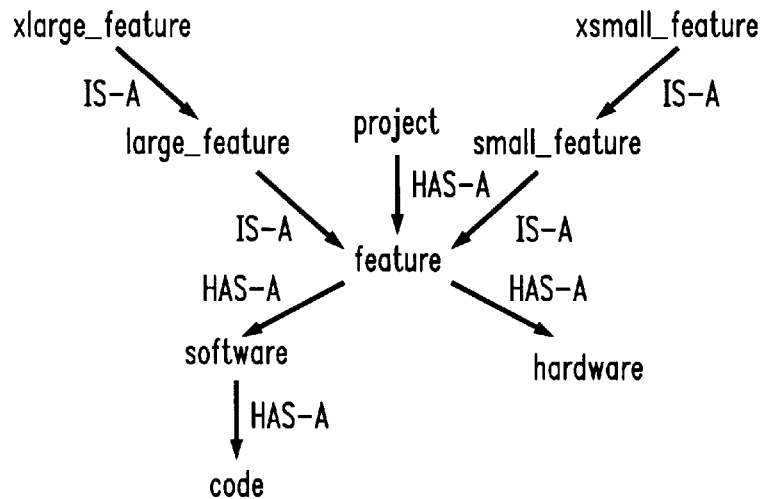
FIG. 1 shows a directed acyclic class graph model of a planning problem for an example software and hardware project.
FIG. 2 shows a table listing attributes of the nodes of the directed acyclic graph of FIG. 1.

FIG. 1 is a directed acyclic graph representing software and hardware development of a project by a company. The nodes of the directed acyclic graph are graphically linked by edges to which there is associated one of two characteristics: "HAS-A" and "IS-A." "HAS-A" edges represent a decomposition of a project into smaller segments. "IS-A" edges represent relationships between object-oriented programming language superclasses. The semantics of "HAS-A" and "IS-A" edges are well-known to those skilled in the art of object oriented programming languages.

With respect to FIG. 1, a "large_feature" is a superclass of an "extra_large" feature. Similarly, a "feature" is a superclass of a "large_feature."

Using terminology and concepts of object oriented programming language, FIG. 1 shows that each project (100) HAS-A feature (102). Each feature (102) has both software and hardware by virtue of the fact that the feature HAS-A software node (104) to which it is associated and a hardware node (106) to which it is also associated. Software (104) in turn has code (108) as a HAS-A edge links the software node (104) to the code node (110).

The feature node (102) is a parent node of two vertices (112 and 114). The child nodes (112 and 114) of the feature node (102) are large_feature (116) and small_feature (118). Large_features (116) and small_features (118) are both IS-A linked to features (102). In turn, a small_features (118) IS-A extra small feature, i.e. xsmall_feature (120). Similarly, an extra large feature (122) IS-A large_feature (116).

The nodes in the graph shown in FIG. 1 can be considered to be objected oriented CLASSES. Those skilled in the art will recognize that the graph of FIG. 1 is a directed acyclical graph which can be represented by a table listing the nodes and a table listing the edges linking them. The graph is FIG. 1 is really an abstraction of data represented in tables. Tabular data can be operated on and processed using SQL. Such processing includes that which is taught in the aforementioned patent application of the inventor.

FIG. 2 shows the attributes associated with each CLASS shown in FIG. 1.

FIG. 3 shows the methods, i.e. the procedures, defined for each class shown in FIG. 1.

FIGS. 1, 2 and 3 collectively describe all of the object oriented CLASSES and definitions representing software and hardware development of a project by a company.

From the foregoing, the object oriented programming concept of CLASS can be implemented using tables. One table is needed to show the nodes of a graph (FIG. 5), another table is required to show the edges coupling the nodes (FIG. 6), yet another table is needed to show attributes of each node (FIG. 7), finally, a table showing class methods (FIG. 8).

FIG. 4 shows an OBJECT graph. FIG. 4 can also be represented using tables. While the CLASS graph can be represented with four tables, the OBJECT graph of FIG. 4 is represented with three tables. One table lists the nodes of the object graph (FIG. 9); a second table lists the edges of the object graph (FIG. 10); a third table lists the attributes defined for each node in the graph (FIG. 11). These three tables represent OBJECT definitions.

For both the CLASS and OBJECT graphs, the creation and deletion of nodes and edges in these graphs can be represented by corresponding insertions and deletions into the appropriate tables using SQL statements.

Demonstrating INHERITANCE requires the existence of a transitive closure table for the CLASS graph. (FIG. 12). Determination of a transitive closure table (FIG. 12) is set forth in the Detailed Description of the application for "Process for Providing Transitive Closure Using Fourth Generation Structured Query Language", (Ser. No. 08/790, 302, filed on Jan. 31, 1997, now U.S. Pat. No. 5,819,257 and assigned to Lucent Technologies, Inc.) which is incorporated herein by reference.

A transitive closure table of the OBJECT graph (FIG. 13) provides the ability to ask graph-traversing questions about objects in the OBJECT graph.

INHERITANCE is the ability for one CLASS to share attribute and method specifications with other CLASSES. Adding a node to an OBJECT graph requires the construction of attributes that a node will inherit from the node or nodes to which it is coupled through the (aforementioned) IS-A edges of the CLASS graph.

A transitive closure table, as described in the aforementioned application, lists all of the paths (of edges coupling nodes) through a directed acyclical graph. Knowing all of the paths through a graph means that all of the nodes of the paths are known. Inasmuch as the nodes have characteristics associated with them, knowing the nodes of a path establishes all of the characteristics of the nodes along a path. Knowing the characteristics of a path means that the descendants of a nodes have the attributes of the parent nodes. Inasmuch as SQL extracts data from the tables by which a directed acyclical graph is represented, and to construct the transitive closure table showing all of the paths through such a graph, SQL can provide INHERITANCE of an object oriented programming language if a transitive closure table is generated.

Figure 14:
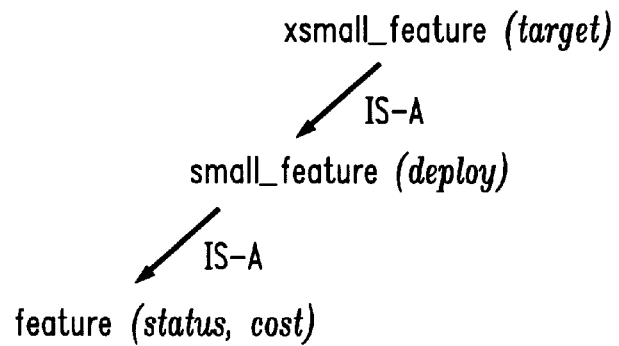
FIG. 14 shows the inheritance hierarchy of features of FIG. 1.

From FIG. 14 it can be seen that small_feature is a specialization of a feature, small_feature therefore inherits attributes of status and cost. Since xsmall_feature is a specialization of a small_feature, it inherits attributes of status, cost, and deploy. Therefore, whenever a record is inserted into tracking_entity for an xsmall_feature, four records are inserted into the tables for tracking_entity_attribute (FIG. 11) for attributes status, cost, deploy, and target by processing data within and comprising the tables using the following SQL procedure and rule to achieve this:

```
Create procedure attribute_insert_proc(
    Tracking_entity_varchar(255) not null not default,
    Tracking_entity_class varchar(255) not null not default
) as
begin
    insert into tracking_entity_attribute (tracking_entity_class, attribute)
    select distinct :tracking_entity, a.attribute
    from tracking_entity_class_attribute a, tracking_entity_class_path p
    where p.child_tracking_entity_class =:tracking_entity_class
    and a.tracking_entity_class=p.parent_tracking_entity_class
    and p.edge in (REFLEXIVE', 'IS-A')
end
create rule attribute_insert after insert of tracking_entity
    execute procedure attribute_insert_proc(
        tracking_entity=new.tracking_entity,
        tracking_entity_class=new.tracking_entity_class
    )
```

POLYMORPHISM is the ability for all objects to respond appropriately to messages received. As set forth above, a "check box" graphical user interface object and a "list box" graphical user interface object both know how to respond to a "redraw yourself" message, but respond differently in performing a redraw of themselves. Of course, each OBJECT must be written to respond to the particular message, but the response after a message is recognized and accepted is unique.

In an object oriented system, the occurrence of an external event triggers the passing of messages to objects. In an object oriented system wherein the objects are database elements (i.e. tabular data), external events comprise: inserting, updating, or deleting records from tables.

By way of example, assume that an attribute of a node is to be updated, for example, the attribute "status" that might be listed in an "attribute" table for the nodes of an object graph. Updating an attribute table for the object graph shown in FIG. 4 using SQL requires processing data within the table by the execution of an SQL statement that might look like:

update_attribute set status='green' where name=99-NS-2261

The execution of the foregoing statement causes the following database "rule" to fire (as the term "fire" is known in the art of SQL programming).

```
Create rule authorize after update of tracking_entity_attribute
    Execute procedure event_handler(
        Message='authorize',
        Tracking_entity=new.tracking_entity
        Attribute=new.attribute
    );
```

Firing the foregoing database "rule" results in the execution of the following SQL procedure.

```
create procedure event_handler(
    Message varchar(255) not null not default,
    Tracking_entity varchar(255) not null not default
    Attribute varchar(255) not null not default
)as
declare
    method varchar(80) not null;
    return_value varchar(255) not null;
    error_string varchar(255) not null;
    parameters varchar(255) not null;
begin
    method= '';
    return_value=0;
    parameters=:tracking_entity+', '+:attribute;
    select m.method into :method
    from tracking_entity e1, tracking_entity_class_path p1, tracking_entity_class_method m1
    where e1.tracking_entity =: tracking_entity
    and p1.child_tracking_entity_class = e1.tracking_entity_class
    and p1.edge in ('REFLEXIVE', 'IS-A')
```

```
    and m1.tracking_entity_class = p1.parent_tracking_entity_class
    and m1.message =: message
    and p1.path_length in (
       select min(p2.path_length)
       from tracking_entity e2, tracking_entity_class_path p2, tracking_entity_class_method m2
       where e2.tracking_entity =: tracking_entity
       and p2.child_tracking_entity_class = e2.tracking_entity_class
       and p2.edge in ('REFLEXIVE', 'IS-A')
       and m2.tracking_entity = p2.parent_tracking_entity
       and m2.message =: message
    );
    if method != '' then
       return_value = execute procedure :method(
       tracking_entity =: tracking_entity, attribute =:attribute);
    endif;
    if return_value != 0 then
       error_string = 'Error executing method '+:method
       raise error -1 :error_string;
    endif;
    raise dbevent :message :parameters;
end
```

Figure 15:
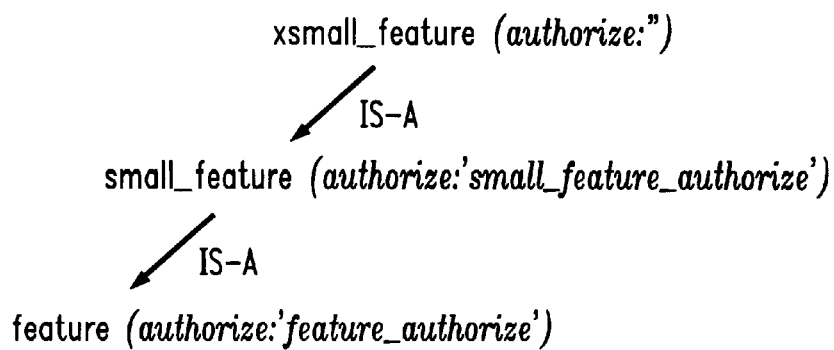
FIG. 15 shows inheritance hierarchy and messages passed between objects shown in FIG. 14.

When this SQL procedure is called and executed, a message parameter is passed to the procedure along with the name of the OBJECT and name of the OBJECT's attribute being updated. Upon executing, this procedure will look up an appropriate method to execute corresponding to the message passed to the procedure. From FIG. 15, it can be seen that the appropriate method to execute is small_feature_authorize. Once the appropriate method has been determined, the procedure executes the method.

Those skilled in the art will recognize that each of the foregoing SQL procedures might be altered in numerous ways to achieve the desired result.

Inasmuch as the foregoing SQL procedure updates OBJECTs transparently, the aforementioned SQL procedure demonstrates object oriented programming POLYMORPHISM. For any message passed to this procedure, the procedure determines the appropriate method to execute.

As set forth above, ENCAPSULATION is the ability to hide data and processing in an OBJECT when an OBJECT is passed a message.

Since SQL is a declarative programming language. Stating what data is wanted from a database, without specifying how to retrieve the data or how data is to be stored is precisely what ENCAPSULATION does. By way of example, ENCAPSULATION can be shown by defining a view that hides how attributes in the tracking_entity_attribute table (FIG. 7) are physically stored. The values of these attributes use tri-state logic and therefore can have a value, have no value, or have an unset, undetermined, unknown state (i.e. nullable). From the definition of tracking_entity_attribute that an attribute value is stored in either charvalue, intvalue, or floatvalue depending upon whether the data type in the associated tracking_entity_class_attribute table (FIG. 11) is a char, int or float value. The following view definition hides these storage details.

```
       Create view tracking_entity_attribute_view as
       Select
              tracking_entity_attribute.*,
              ifnull(charvalue,
                 Ifnull(varchar(intvalue),
                    Ifnull(varchar(floatvalue),
                       ''))) as attribute_value
       from
              tracking_entity_attribute.
```

It is well-known that certain classes of mathematical problems can be modeled and solved using any one of several computer programming languages. It is also well-known that many of these problems are solved using object oriented languages.

Heretofore, Structured Query Language has been used for solving certain problems largely associated with tabular data. By using the methods taught herein, it is now possible to solve much wider classes of problems using SQL, by modeling the problems in a tabular format and employing SQL methodologies taught herein.

What is claimed is:

1. A method for implementing object oriented programming language CLASS functionality using a structured query programming language, the method comprising the steps of:

a) assigning to nodes of a directed acyclic graph, predetermined object oriented programming language identities of CLASSES;

b) assigning to edges linking said nodes of said directed acyclic graph at least one of an IS-A and a HAS-A property classification;

c) generating first tables in a computer, listing the identities of said nodes;

d) generating second tables in a computer listing classifications of edges linking said nodes; and e) updating said first and/or second tables in a computer using a predetermined set of structured query programming language statements to provide object oriented CLASS functionality to entries of said first and/or second tables, wherein the step of updating comprises the step of executing a structured query programming language statement of a procedure that processes information from said first and/or second tables concerning at least one identity of said nodes of said directed acyclic graph and at least one edge of said directed acyclic graph to update said first and/or second tables.

2. The method of claim 1 wherein said step b) of assigning to edges linking said nodes of said directed acyclic graph at least one of an IS-A and a HAS-A property classification comprises the step of listing at least one of an IS-A and a HAS-A property classification in at least one table stored in a computer.

3. The method of claim 1 wherein said step c) of generating said first tables in a computer comprises the step of storing and retrieving data in random access memory of a computer.

4. A method for implementing object oriented programming language the method comprising the steps of:
   a) assigning to nodes of a directed acyclic graph, predetermined identities of object oriented programming language OBJECTS;
   b) assigning to edges linking said nodes of said directed acyclic graph at least one HAS-A property classification;
   c) generating first tables in a computer listing the identities of said nodes;
   d) generating second tables in a computer listing edges of said graph; and
   e) updating said first and/or second tables in a computer using a predetermined set of structured query programming language statements to provide object oriented programming language OBJECT functionality to entries of said first and/or second tables, wherein the step of updating comprises the step of executing a structured query programming language statement of a procedure that processes information from said first and/or second tables concerning at least one identity of said nodes of said directed acyclic graph and at least one edge of said directed acyclic graph to update said first and/or second tables.

5. The method of claim 4 wherein said steps b), c) and d) comprise the step of storing and retrieving data in random access memory of a computer.

6. A method for implementing object oriented programming language INHERITANCE functionality using a structured query programming language the method comprising the steps of:
   a) assigning to nodes of a directed acyclic graph, object oriented programming language identities of CLASSES and forming thereby a CLASS graph;
   b) assigning to edges linking said nodes of said directed acyclic graph at least one of an IS-A and a HAS-A property classification;
   c) generating first tables in a computer listing the identities of said nodes;
   d) generating second tables in a computer listing classifications of edges linking said nodes;
   e) generating a transitive closure table in a computer for said CLASS graph; and
   f) querying said transitive closure table and said first and/or second tables in a computer using a predetermined set of structured query programming language statements to provide object oriented programming language INHERITANCE functionality to entries of said transitive closure table, wherein the step of querying comprises the step of executing a structured query programming language statement of a procedure that processes information from said first and/or second tables concerning at least one identity of said nodes of said directed acyclic graph that comprises said CLASS graph and at least one edge of said directed acyclic graph that comprises said CLASS graph to update said first and/or second tables.

7. The method of claim 6 wherein said step b) of assigning to edges linking said nodes of said directed acyclic graph at least one of an IS-A and a HAS-A property classification comprises the step of listing at least one of an IS-A and a HAS-A property classification in at least one table stored in memory of a computer.

8. The method of claim 6 wherein said steps c) and d) comprise the step of storing and retrieving data in random access memory of a computer.

9. A method for implementing object oriented programming language POLYMORPHISM functionality using a structured query programming language, the method comprising the steps of:
   a) assigning to nodes of a directed acyclic graph, object oriented programming language identities of CLASSES and forming thereby a CLASS graph;
   b) assigning to edges linking said nodes of said CLASS graph at least one of an IS-A and a HAS-A property classification;
   c) generating tables in a computer listing the identities of said nodes of said CLASS graph;
   d) generating tables in a computer listing classifications of edges linking said nodes of said CLASS graph;
   e) generating a transitive closure table in a computer for said CLASS graph;
   f) assigning to nodes of a directed acyclic graph, object oriented programming language identities of OBJECTS and forming thereby an OBJECT graph;
   g) assigning to edges linking said nodes of said OBJECT graph at least one HAS-A property classification;
   h) generating first tables in a computer listing the identities of said nodes of said OBJECT graph;
   i) generating second tables in a computer listing classifications of edges linking said nodes of said OBJECT graph;
   j) executing a structured query language procedure in a computer that queries said first and/or second tables for a specified message and returns the name of a METHOD to execute corresponding to the message, wherein the step of executing a structured query language procedure in a computer comprises the step of executing a structured query programming language statement of a procedure that processes information from said first and/or second tables concerning at least one identity of said nodes of said directed acyclic graph that comprises said OBJECT graph and at least one edge of said directed acyclic graph that comprises said OBJECT graph to update said first and/or second tables; and
   k) executing said METHOD to provide object oriented programming language POLYMORPHISM functionality.

10. The method of claim 9 wherein said step b) of assigning to edges linking said nodes of said CLASS graph at least one of an IS-A and a HAS-A property classification comprises the step of listing at least one of an IS-A and a HAS-A property classification in at least one table stored in memory of a computer.

11. The method of claim 9 wherein said steps c) and d) comprise the step of storing and retrieving data in random access memory of a computer.

12. A method for implementing object oriented programming language ENCAPSULATION functionality using a structured query programming language, the method comprising the steps of:

a) assigning to nodes of a directed acyclic graph, predetermined object oriented programming language identities of OBJECTS;
b) generating first tables in a computer listing the identities of said nodes;
c) generating second tables in a computer, the second tables including information concerning edges linking said nodes; and
d) defining structured query language views that abstract the data types of said identities in said first and/or second tables, providing thereby, object oriented programming language ENCAPSULATION functionality, wherein the step of defining structured query language views comprises the step of executing a structured query programming language statement of a procedure that processes information from said first and/or second tables concerning at least one identity of said nodes of said directed acyclic graph and at least one edge of said directed acyclic graph to update said first and/or second tables.

* * * * *